(12) United States Patent
Menczykalski et al.

(10) Patent No.: US 11,215,078 B2
(45) Date of Patent: Jan. 4, 2022

(54) GAS TURBINE ENGINE

(71) Applicants: Rolls-Royce Deutschland Ltd & Co KG, Blankenfelde-Mahlow (DE); Rolls-Royce plc, London (GB)

(72) Inventors: Stefan Menczykalski, Berlin (DE); Stephan Uhkoetter, Berlin (DE); John R. Mason, Bristol (GB); David A. Edwards, Derby (GB); Neil Davies, Ashbourne (GB); Lynn Hammond, Cheltenham (GB); David Williams, Bristol (GB)

(73) Assignees: Rolls-Royce Deutschland Ltd & Co. KG, Blankenfelde-Mahlow (DE); Rolls-Royce PLC, London (GB)

( * ) Notice: Subject to any disclaimer, the term of this patent is extended or adjusted under 35 U.S.C. 154(b) by 258 days.

(21) Appl. No.: 16/382,832

(22) Filed: Apr. 12, 2019

(65) Prior Publication Data
US 2019/0316522 A1    Oct. 17, 2019

(30) Foreign Application Priority Data

Apr. 17, 2018   (DE) .......................... 102018109108.7

(51) Int. Cl.
*F01D 25/20* (2006.01)
*F02C 7/06* (2006.01)
(Continued)

(52) U.S. Cl.
CPC ............. *F01D 25/20* (2013.01); *F01D 25/18* (2013.01); *F02C 7/06* (2013.01); *F16H 57/0442* (2013.01); *F02C 7/36* (2013.01)

(58) Field of Classification Search
CPC ...... F02C 7/06; F02C 7/36; F02C 3/04; F02C 7/32; F01D 25/18; F01D 25/20;
(Continued)

(56) References Cited

U.S. PATENT DOCUMENTS 8,230,974 B2    7/2012  Pamin
8,307,626 B2 *  11/2012 Sheridan ............... F01D 25/20
                                                60/39.08
(Continued)

FOREIGN PATENT DOCUMENTS

DE   102018109108.7    7/2012
EP      2224120 A2     9/2010
(Continued)

OTHER PUBLICATIONS

Uhkoetter, Stephan et al.—U.S. Appl. No. 16/539,412, filed Aug. 13, 2019.
(Continued)

*Primary Examiner* — Gerald L Sung
*Assistant Examiner* — Rene D Ford
(74) *Attorney, Agent, or Firm* — Timothy J. Klima; Shuttleworth & Ingersoll PLC

(57) ABSTRACT

A gas turbine engine for an aircraft including a unit supplied with oil from a first oil circuit and a second oil circuit. The first oil circuit and the second oil circuit each are fluidly coupled with at least one inlet and with at least one outlet of the unit and with at least one inlet and with at least one outlet of an oil tank. The first oil circuit and the second oil circuit are configured to receive oil from the oil tank and to direct the received oil to the unit. The oil tank is incorporating offset outlets to each of the oil circuits. The offset outlet of the second oil circuit is positioned higher in the oil tank than the offset outlet of the first oil circuit.

8 Claims, 3 Drawing Sheets

(51) Int. Cl.
  *F01D 25/18* (2006.01)
  *F16H 57/04* (2010.01)
  *F02C 7/36* (2006.01)

(58) Field of Classification Search
  CPC ....... F05D 2260/98; F05D 2260/40311; F16H 57/0442; F16H 57/0443; F16H 57/0435; F16H 57/0449; F16H 57/0424; F16H 57/0417; F16N 2260/05; F16N 2260/08; Y02T 50/60; F02K 3/06
  See application file for complete search history.

(56) References Cited

U.S. PATENT DOCUMENTS

| | | | |
|---|---|---|---|
| 8,484,942 B1 | 7/2013 | McCune et al. | |
| 9,410,448 B2 | 8/2016 | Sheridan et al. | |
| 9,909,453 B2 | 3/2018 | Fang et al. | |
| 10,107,142 B2 * | 10/2018 | Mastro | F02C 7/36 |
| 2013/0319006 A1 | 12/2013 | Parnin et al. | |
| 2014/0124297 A1 | 5/2014 | Motto | |
| 2016/0032773 A1 | 2/2016 | James et al. | |
| 2017/0175874 A1 * | 6/2017 | Schwarz | F01D 21/00 |
| 2018/0073395 A1 | 3/2018 | Parnin et al. | |
| 2018/0163566 A1 | 6/2018 | Fang et al. | |
| 2019/0323597 A1 * | 10/2019 | Sheridan | F01D 25/20 |

FOREIGN PATENT DOCUMENTS

| | | |
|---|---|---|
| EP | 3102807 A2 | 12/2016 |
| EP | 3159500 A1 | 4/2017 |
| EP | 3163049 A2 | 5/2017 |
| WO | 2014133836 A1 | 9/2014 |
| WO | 2014152347 A2 | 9/2014 |
| WO | 2015047514 A2 | 4/2015 |
| WO | 2015047515 A2 | 4/2015 |

OTHER PUBLICATIONS

German Search Report dated May 3, 2019 from related German Patent App No. DE102018120511.2.
European Search Report dated Aug. 27, 2019 from counterpart European App No. 19166159.4.
German Search Report dated Dec. 18, 2018 for counterpart German Patent Application No. DE 10 2018 109 108.7.
German Search Report dated Jan. 7, 2019 from related German Patent Application No. DE 10 2018 109 100.1.
European Search Report dated Sep. 20, 2019 from related European Patent Application No. EP 19166136.2.
Menczykalski, Stefan et al.—U.S. Appl. No. 16/382,923, filed Apr. 12, 2019.

* cited by examiner

GAS TURBINE ENGINE

This application claims priority to German Patent Application DE102018109108.7 filed Apr. 17, 2018, the entirety of which is incorporated by reference herein.

The present disclosure relates to a gas turbine engine comprising an engine core including at least one turbine, at least one compressor, and at least one shaft connecting the turbine to the compressor. A fan is located upstream of the engine core. The fan comprises a plurality of fan blades.

A typical gas turbine engine includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Existing turbofan solutions for aircrafts operate an oil system with a single oil circuit and do not incorporate a gearbox to drive the fan section such that the fan section may rotate at a speed different than the turbine section so as to increase the overall propulsive efficiency of the engine. This single oil circuit feeds and scavenges oil to all users in the engine at all operating conditions. The pilot of an aircraft is provided with an indication if the system is not operating as required, so appropriate action can be taken. The unacceptable oil system performance can be caused in a number of ways including oil leaks, pump failure, low oil quantities etc. It is standard practice to account for a delay between any flight deck indication and action from the pilot. This may be as long as 5 minutes, particularly if the indication is muted for some flight conditions.

In engine architectures incorporating such a gearbox, a shaft driven by one of the turbine sections provides an input to the epicyclical gear assembly that drives the fan section at a reduced speed such that both the turbine section and the fan section can rotate at closer to optimal speeds. The gear assembly requires lubrication to prevent premature wear of bearing surfaces. Accordingly, a lubrication system that includes a main pump or pumps, two oil circuits for the gearbox and main reservoir is used during engine operation. However, when the engine is not operating, airflow through the fan may cause the gear assembly to rotate. Also, certain manoeuvres with the engine operating may briefly interrupt the operation of the main system. The system is therefore configured to ensure that oil is supplied to these gearbox bearings under all conditions that lubrication and cooling is required including under failure conditions of the main oil delivery system.

Such a gearbox incorporates journal bearings that require a constant feed of oil to operate. There may be capability for a few seconds but it is unrealistic to expect this to increase to 5 minutes at power or extended periods (hours) at windmill conditions. Failure to provide sufficient oil in the right condition may lead to gearbox failure or seizure which may result in a locked fan. If the fan is unable to rotate, this is likely to constitute a hazardous condition to the aircraft. However, even if the fan does not lock there will be damage to the bearings which will then need replacing.

It is the object of the present disclosure to provide a gas turbine engine, in which an undesirable reduction in oil flow is ascertainable in a simple way.

This object is achieved through a gas turbine engine with features as disclosed herein.

As noted elsewhere herein, the present disclosure relates to a gas turbine engine. Such a gas turbine engine may include an engine core comprising a turbine, a combustor, a compressor, and a core shaft connecting the turbine to the compressor. Such a gas turbine engine may comprise a fan (having fan blades) located upstream of the engine core.

A unit of the gas turbine engine may be supplied with oil from a first oil circuit and at least a second oil circuit. The first oil circuit and the second oil circuit each may fluidly be coupled with at least one inlet and with at least one outlet of the unit and with at least one inlet and with at least one outlet of an oil tank. Furthermore, the first oil circuit and the second oil circuit are configured to receive oil from the oil tank and to direct the received oil to the unit.

To protect for example journal bearings of the unit against the single point failure threat of loss of oil from the system, the oil tank may incorporate offset outlets to each of the oil circuits. The offset outlet of the second oil circuit may be positioned higher in the oil tank than the offset outlet of the first oil circuit feeding solely to the unit when the oil tank is in its installation position in the gas turbine engine during a level flight of an aircraft comprising the gas turbine engine.

The height of the offset outlet of the second oil circuit in the tank defines a specific oil level in the tank. This specific oil level is designed so that a defined oil volume is stored in the tank when the specific oil level is present. An oil volume in the tank greater than or equal to the defined oil volume ensures sufficient oil supply to the unit.

In the event of low oil levels the second oil circuit will generate a low oil pressure warning first without the first oil circuit having yet been affected. The level of offset can be design such that, under all reasonable rates of oil loss, the pilot has reacted to the warning before the remaining feed to the unit, i. e. to journal bearings of the unit is lost/reduced.

In the disclosed gas turbine engine two or more oil circuits are incorporated within the engine. The oil circuits are configured to receive oil from the unit or a separate oil reservoir and to direct the received oil back into the unit.

The gas turbine engine as described and claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The unit may be designed as a gearbox that receives an input from the shaft and outputs drive to the fan so as to drive the fan at a lower rotational speed than the shaft. The input to the gearbox may be directly from the core shaft, or indirectly from the core shaft, for example via a spur shaft and/or gear or from a separate turbine. The core shaft may rigidly connect the turbine and the compressor, such that the turbine and compressor rotate at the same speed (with the fan rotating at a lower speed).

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The first oil circuit and/or the second oil circuit may include a heat exchanger especially for cooling the oil and/or a filter and monitoring sensors.

The first oil circuit and the second oil circuit may fluidly be coupled with a common inlet of the unit. Moreover, the first oil circuit and the second oil circuit may fluidly be coupled with a common outlet of the unit.

In one embodiment of the gas turbine engine the first oil circuit and the second oil circuit each are fluidly coupled with a separate inlet of the unit.

In a further embodiment of the gas turbine engine the first oil circuit and the second oil circuit each can be fluidly coupled with a separate outlet of the unit.

The first oil circuit and the second oil circuit each may include at least one pump.

In an embodiment of the gas turbine engine the pump of the second oil circuit may be driven by the first core shaft and the pump of the first oil circuit may be driven by the fan. In this case a failure of the second oil circuit or of the pump of the second oil circuit may be compensated by the first oil circuit in a simple way even when the gas turbine engine is shut-off followed by a windmill operation mode of the gas turbine engine.

The heat exchanger of the first oil circuit may be arranged between the pump and the inlet of the unit, between the outlet of the unit and the inlet of the tank, or between the outlet of the tank and the feeding pump for cooling oil in an appropriate manner.

The heat exchanger of the second oil circuit may be arranged between the pump and the inlet of the unit, between the outlet of the unit and the inlet of the tank or between the outlet of the tank and the pump for cooling oil in an appropriate manner.

Further, the filter and/or the monitoring sensors provided in the first oil circuit and/or the second oil circuit may be arranged between the pump and the inlet of the unit, between the outlet of the unit and the inlet of the tank, or between the outlet of the tank and the pump.

The disclosed oil system of the gas turbine engine may utilise a single oil tank with at least two separate circuits. The first circuit will have a feeding pump that deliver the oil (via appropriate conditioning units, —filters, coolers etc.) to the gears and a proportion of the oil needed by the journal bearings of the unit. The second circuit will include a feeding pump to (again via appropriate conditioning units) deliver the remaining oil to the journal bearings and preferably the full flow required by all other users of the turbomachinery circuit, such as bearings, seals, squeeze films etc.

The two feeds to the journal bearings may be via independent transfer methods from the static to rotating elements to ensure no single point of failure but may not be required if an appropriate safety case is generated.

The nominal system will split the journal bearing flow 50:50 but the disclosed gas turbine engine is equally applicable to any flow split. The system may also incorporate a pump of the first circuit for utilisation during emergency operation mode or during windmilling once the engine is shutdown and if required during the normal operation mode.

In the event of any failure type in either circuit the disclosed gas turbine engine will ensure the bearings receive circa 50% of the optimum oil flow. Although overheating will occur, this will be sufficient to minimise any bearing damage and to avoid a hazardous outcome.

Thus, the present gas turbine engine guards against a single point failure escalating to a hazardous condition, e. g. a locked fan. Furthermore, the disclosed gas turbine engine guards against needing to circumvent the pilot action with an active control system, which may suffer from spurious activation.

The second oil circuit may comprise a sensor for sensing a feeding pressure in the second oil circuit applied to the gearbox.

A method of operating an oil system of the gas turbine engine may comprise collecting oil from the unit and supplying the oil to the tank, pumping the oil from the tank to the unit via the first oil circuit and via the second oil circuit as long as the oil level in the tank is greater than or equal to an oil level predefined by the height level of the inlet opening of the offset outlet inside of the tank, pumping oil from the tank to the unit via the first oil circuit when the oil level in the tank is less than the predefined oil level and generating a warning signal when a feeding pressure in the second oil circuit applied to the unit is detected by the sensor which is less than or equal to a predefined value.

The predefined value corresponds with an unsuitable oil flow in the second oil circuit to unit bearings which may cause undesirable bearing overload.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 4:
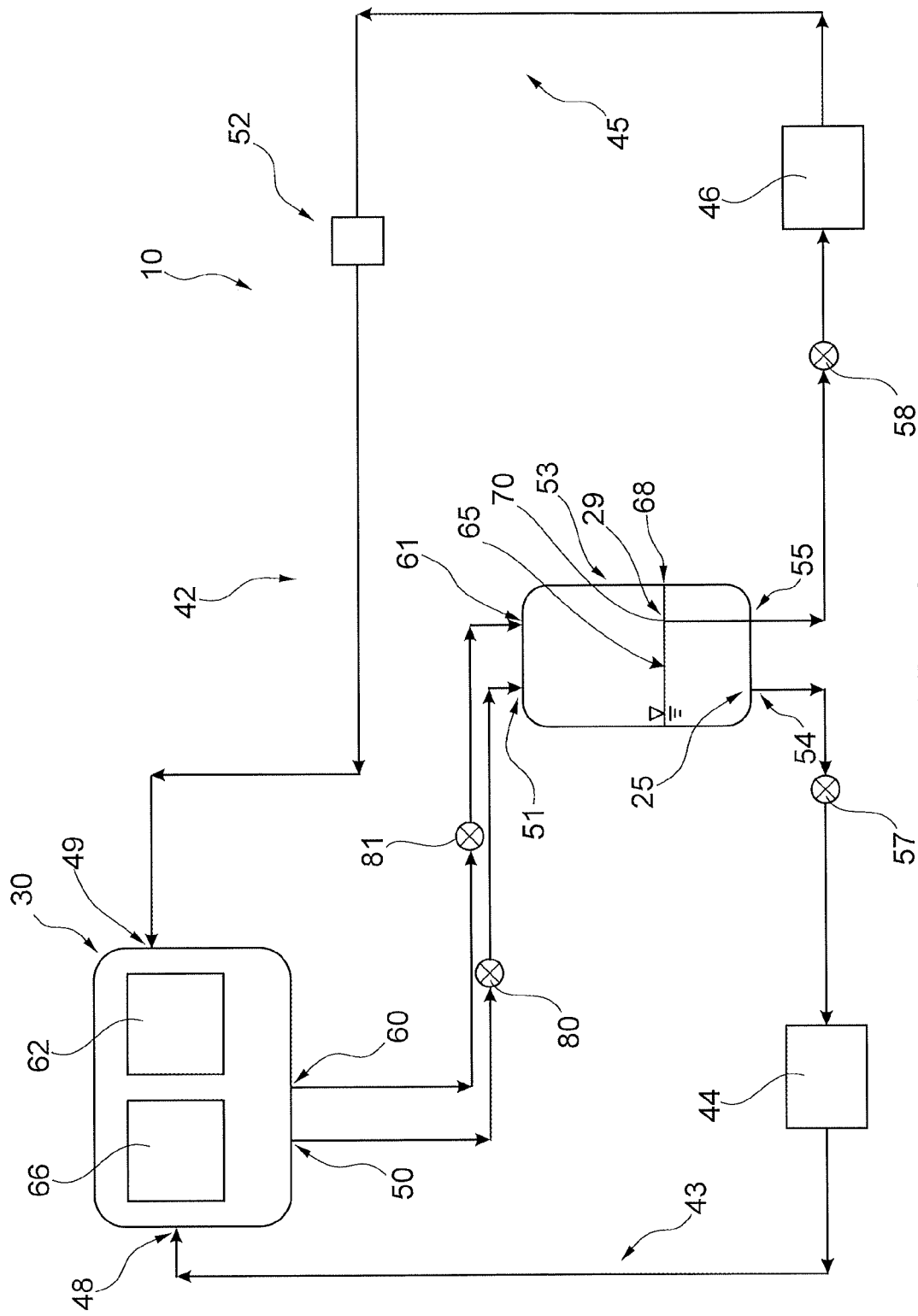

FIG. 4 an embodiment of an oil system of a gas turbine engine.

Figure 1:
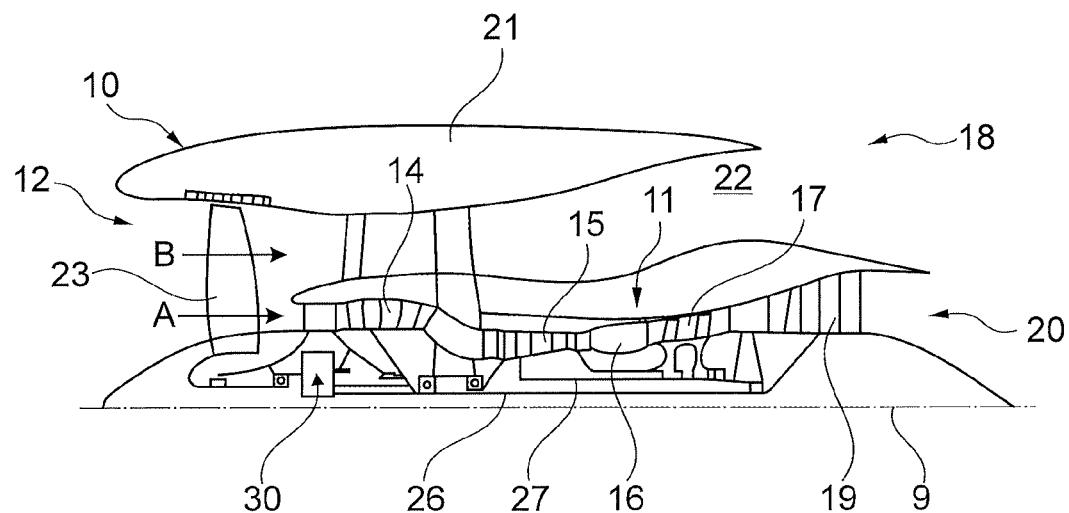
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
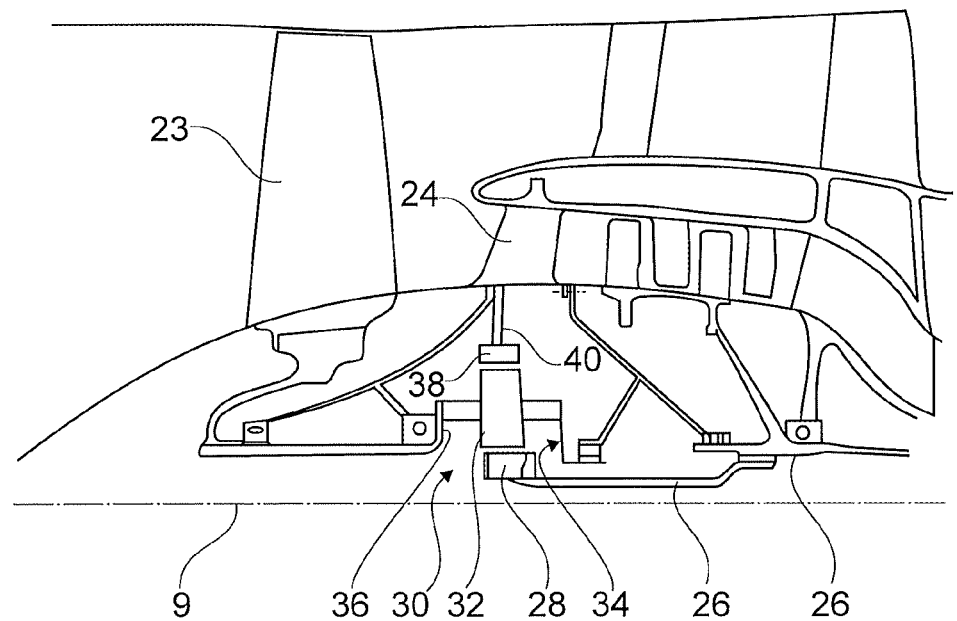
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
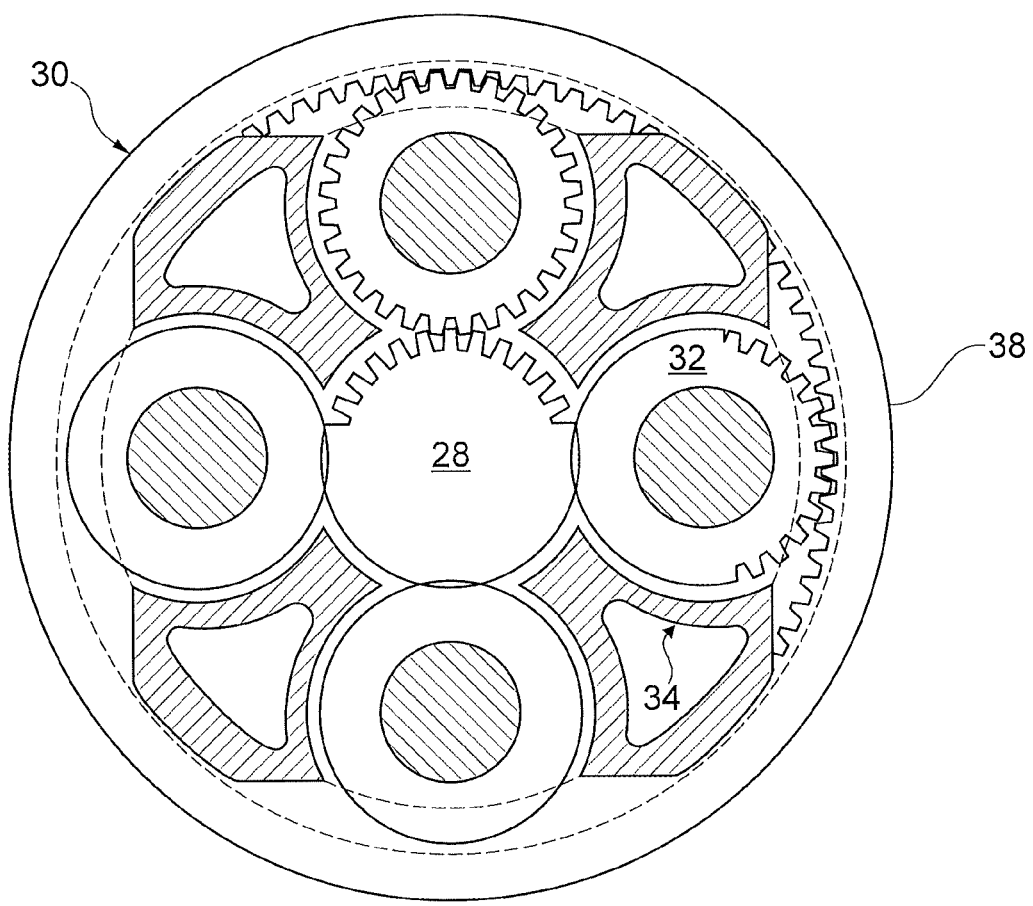
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIG. 2 and FIG. 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 2 and FIG. 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20.

However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4 shows an embodiment of an oil system 42 of the gas turbine engine 10. The oil system 42 comprises a first oil circuit 43 including a heat exchanger 44 and a second oil circuit 45 including a heat exchanger 46. The first oil circuit 43 and the second oil circuit 45 are fluidly coupled with an inlet 48, 49 of the gearbox 30. A first outlet 50 of the gearbox 30 is fluidly coupled with a first inlet 51 of the oil tank 53 by the first oil circuit 43. Moreover, a second outlet 60 of the gearbox 30 is fluidly coupled with a second inlet 61 of the oil tank 53 by the second oil circuit 43. The inlet 48 is fluidly coupled with an oil transfer unit 66 which is arranged inside the gearbox 30. In contrast, the inlet 49 is fluidly coupled to a further oil transfer unit 62 of the gearbox 30 which is located inside the gearbox 30. Moreover, the first oil circuit 43 and the second oil circuit 45 each are fluidly coupled with an outlet 54, 55 of the oil tank 53.

The first oil circuit 43 and the second oil circuit 45 each include a feeding pump 57, 58 driven by the core shaft 26 or by the core shaft 27. In a further embodiment the feeding pump 57 of the first oil circuit 43 is driven by the fan 23. The first oil circuit 43 and the second oil circuit 45 are configured to receive oil from the oil tank 53 and to direct the received oil to the gearbox 30.

In a further embodiment the first oil circuit 43 and the second oil circuit 45 each include a scavenge pump 80, 81 which are located between the gearbox 30 and the tank 53. The scavenge pump 80 of the first oil circuit 43 may be driven by the fan 23 to ensure that oil is routed from the gearbox 30 to the tank 53 even when the second oil circuit is defective, the gas turbine engine 9 is shut down and the gas turbine engine is operated in the windmill operation mode.

The heat exchanger 44 of the first oil circuit 43 is arranged between the feeding pump 57 and the inlet 48 of the gearbox 30. The heat exchanger 46 of the second oil circuit 45 is arranged between the feeding pump 58 and the inlet 49 of the gearbox 30. The second oil circuit 45 comprises a sensor 52 for sensing a feeding pressure in the second oil circuit 45 applied to the gearbox 30.

To protect the journal bearings of the gearbox 30 against the single point failure threat of loss of oil from the oil system 42, the oil tank 53 incorporates offset outlets 25, 29 to each of the oil circuits 43, 45. The second oil circuit 45 offset outlet 29 is positioned higher in the oil tank 53 than the offset outlet 25 of the first circuit 43. In the event of low oil levels in the oil tank 53 the second oil circuit 45 will generate a low oil pressure warning or another warning signal first without the first circuit 43 having yet been affected. The level of offset can be designed such that, under all reasonable rates of oil loss, the pilot has reacted to the warning before the first oil circuit 43 feed to the journal bearings is lost or reduced.

In an operational mode of the oil system 42 of the gas turbine engine 10 oil is collected from the gearbox 30 and supplied to the tank 53. The oil is pumped from the tank 53 to the gearbox 30 by the feeding pump 57 via the first oil circuit 43 and by the feeding pump 58 via the second oil circuit 45 as long as the oil level in the tank 53 is greater than or equal to an oil level 65 predefined by the height level 68 of an inlet opening 70 of the offset outlet 29 inside of the tank 53. The oil is pumped from the tank 53 to the gearbox 30 only by the feeding pump 57 via the first oil circuit 43 when the oil level in the tank 53 is less then the predefined oil level 65. In the latter case a warning signal is generated when a feeding pressure in the second oil circuit 45 applied to the gearbox 30 is detected by the sensor 52 which is less than or equal to a predefined value.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

PARTS LIST 9 principal rotational axis
10 engine
11 core
12 air intake
14 low pressure compressor
15 high pressure compressor
16 combustion equipment
17 high-pressure turbine
18 bypass exhaust nozzle
19 low pressure turbine
20 core exhaust nozzle
21 nacelle
22 bypass duct
23 propulsive fan
24 stationary supporting structure
25 offset inlet
26 shaft
27 interconnecting shaft
28 sun gear
29 offset inlet
30 epicyclic gearbox
31 auxiliary gearbox
32 planet gears
34 planet carrier
36 linkage
38 ring gear
40 linkage
42 oil system
43 first oil circuit
44 heat exchanger
45 second oil circuit
46 heat exchanger
48 inlet
49 inlet
50 first outlet of the gearbox
51 first inlet of the oil tank
52 sensor
53 oil tank
54 outlet of the oil tank coupled with the first oil circuit
55 outlet of the oil tank coupled with the second oil circuit
57 feeding pump of the first oil circuit
58 feeding pump of the second oil circuit
60 second outlet of the gearbox
61 second inlet of the oil tank
62 oil transfer unit
65 predefined oil level
66 oil transfer unit
68 height level
70 inlet opening of the offset outlet of the second oil circuit
80 scavenge pump of the first oil circuit
81 scavenge pump of the second oil circuit
A core airflow
B bypass airflow

The invention claimed is:

1. A gas turbine engine for an aircraft comprising:
an engine core comprising a turbine, a compressor and a shaft connecting the turbine to the compressor;
a fan located upstream of the engine core, the fan comprising a plurality of fan blades;
a unit supplied with oil from a first oil circuit and a second oil circuit, the unit including at least one inlet and first and second outlets;
an oil tank including at least one inlet and at least one outlet;
the first oil circuit and the second oil circuit each being fluidly coupled with the at least one inlet and respectively with the first and second outlets of the unit and with the at least one inlet and the at least one outlet of the oil tank;
the first oil circuit and the second oil circuit configured to receive oil from the oil tank and to direct the received oil to the unit;
the at least one outlet of the oil tank including first and second offset outlets respectively connected to the first and second oil circuits; and
the second offset outlet connected to the second oil circuit being positioned higher in the oil tank than the first offset outlet connected to the first oil circuit;
the first and second circuits including respectively, first and second scavenge pumps positioned between the first and second outlets of the unit and the at least one inlet of the oil tank;
the first scavenge pump being driven by the fan to provide oil from the unit to the oil tank through windmilling of the fan even when the second oil circuit is defective.

2. The gas turbine engine according to claim 1, wherein:
the turbine is a first turbine, the compressor is a first compressor, and the shaft is a first core shaft;
the engine core further comprising a second turbine, a second compressor, and a second core shaft connecting the second turbine to the second compressor; and
the second turbine, second compressor, and second core shaft are arranged to rotate at a higher rotational speed than the first core shaft.

3. The gas turbine engine according to claim 1, wherein:
the first oil circuit includes a heat exchanger.

4. The gas turbine engine according to claim 1, wherein:
the second oil circuit includes a heat exchanger.

5. The gas turbine engine according to claim 1, wherein:
the first oil circuit and the second oil circuit each include a pump driven by the shaft.

6. The gas turbine engine according to claim 1, wherein:
the second oil circuit includes a sensor for sensing a feeding pressure in the second oil circuit applied to the unit.

7. The gas turbine engine according to claim 1, wherein:
the unit is a gearbox that receives an input from the shaft and outputs drive to the fan to drive the fan at a lower rotational speed than the shaft.

8. A method of operating an oil system of a gas turbine engine comprising:
providing a gas turbine engine for an aircraft comprising:
an engine core comprising a turbine, a compressor and a shaft connecting the turbine to the compressor;
a fan located upstream of the engine core, the fan comprising a plurality of fan blades;
a unit supplied with oil from a first oil circuit and a second oil circuit, the unit including at least one inlet and first and second outlets;
an oil tank including at least one inlet and at least one outlet;
the first oil circuit and the second oil circuit each being fluidly coupled with the at least one inlet and respectively with the first and second outlets of the unit and with the at least one inlet and the at least one outlet of the oil tank;
the first oil circuit and the second oil circuit configured to receive oil from the oil tank and to direct the received oil to the unit;
the at least one outlet of the oil tank including first and second offset outlets respectively connected to the first and second oil circuits; and
the second offset outlet connected to the second oil circuit being positioned higher in the oil tank than the first offset outlet connected to the first oil circuit;
the first and second circuits including respectively, first and second scavenge pumps positioned between the first and second outlets of the unit and the at least one inlet of the oil tank;
the first scavenge pump being driven by the fan to provide oil from the unit to the oil tank through windmilling of the fan even when the second oil circuit is defective;
collecting the oil from the unit and supplying the oil to the oil tank;
pumping the oil from the oil tank to the unit via the first oil circuit and via the second oil circuit as long as the oil level in the oil tank is greater than or equal to an oil level predefined by a height level of an inlet opening of the second offset outlet inside of the oil tank;
pumping the oil from the oil tank to the unit via the first oil circuit when the oil level in the tank is less than the predefined oil level;
generating a warning signal when a feeding pressure in the second oil circuit applied to the unit is detected by a sensor in the second oil circuit to be less than or equal to a predefined value.

\* \* \* \* \*